United States Patent [19]
Ueno

[11] Patent Number: 5,831,675
[45] Date of Patent: Nov. 3, 1998

[54] SOLID STATE IMAGING DEVICE

[75] Inventor: Takahisa Ueno, Kanagawa, Japan

[73] Assignee: Sony Corporation, Japan

[21] Appl. No.: 764,207

[22] Filed: Dec. 13, 1996

[30] Foreign Application Priority Data

Dec. 18, 1995 [JP] Japan .................................. 7-328950

[51] Int. Cl.[6] ...................................................... H04N 3/14
[52] U.S. Cl. ........................... 348/302; 257/229; 348/308
[58] Field of Search ..................................... 348/302, 301, 348/300, 308; 257/229; 250/200, 208

[56] References Cited

U.S. PATENT DOCUMENTS

| | | | |
|---|---|---|---|
| 5,270,531 | 12/1993 | Yonemoto | 348/308 |
| 5,276,521 | 1/1994 | Mori | 348/301 |
| 5,311,320 | 5/1994 | Hashimoto | 348/243 |
| 5,619,262 | 4/1997 | Uno | 348/308 |

*Primary Examiner*—Andrew I. Faile
*Assistant Examiner*—Aung S. Moe
*Attorney, Agent, or Firm*—Ronald P. Kananen

[57] ABSTRACT

A solid state imaging device according to the present invention includes a pixel transistor having a first electrode, a second electrode and a control electrode, a power supply terminal connected to the first electrode, a signal line connected to the second electrode, a reset bias terminal connected to the first electrode and the second electrode, a first switch connected between the power source terminal and the first electrode, a second switch connected between the reset bias terminal and the first electrode, and a reset switch connected between the reset bias terminal and the second electrode. The pixel transistor accumulates a charge corresponding to an amount of received light. The first switch is set in its off-state and the second switch and the reset switch are set in their on-states during a first period of a horizontal blanking period. Thereafter, a state of each of the first, second and reset switches is changed. The first switch is set in its on-state and the second switch and the reset switch are in their off-states in a second period of the horizontal blanking period succeeding to the first period.

18 Claims, 9 Drawing Sheets

SOLID STATE IMAGING DEVICE

BACKGROUND OF THE INVENTION

1. Field of the Invention

The present invention relates to a solid state imaging device and particularly to an amplification type solid state imaging device of a capacity load operation system.

2. Description of the Related Art

Recently, demand for higher resolution in solid state imaging devices has promoted development of an amplification type solid state imaging device which has no smear and can have minute pixels. The amplification type solid state imaging device has a metal-oxide-semiconductor (MOS) type transistor for amplifying an optical signal with respect to every image. The amplification type solid state imaging device reads out a charge stored in a pixel as a signal indicative of a current modulation of the MOS transistor.

Figure 1:
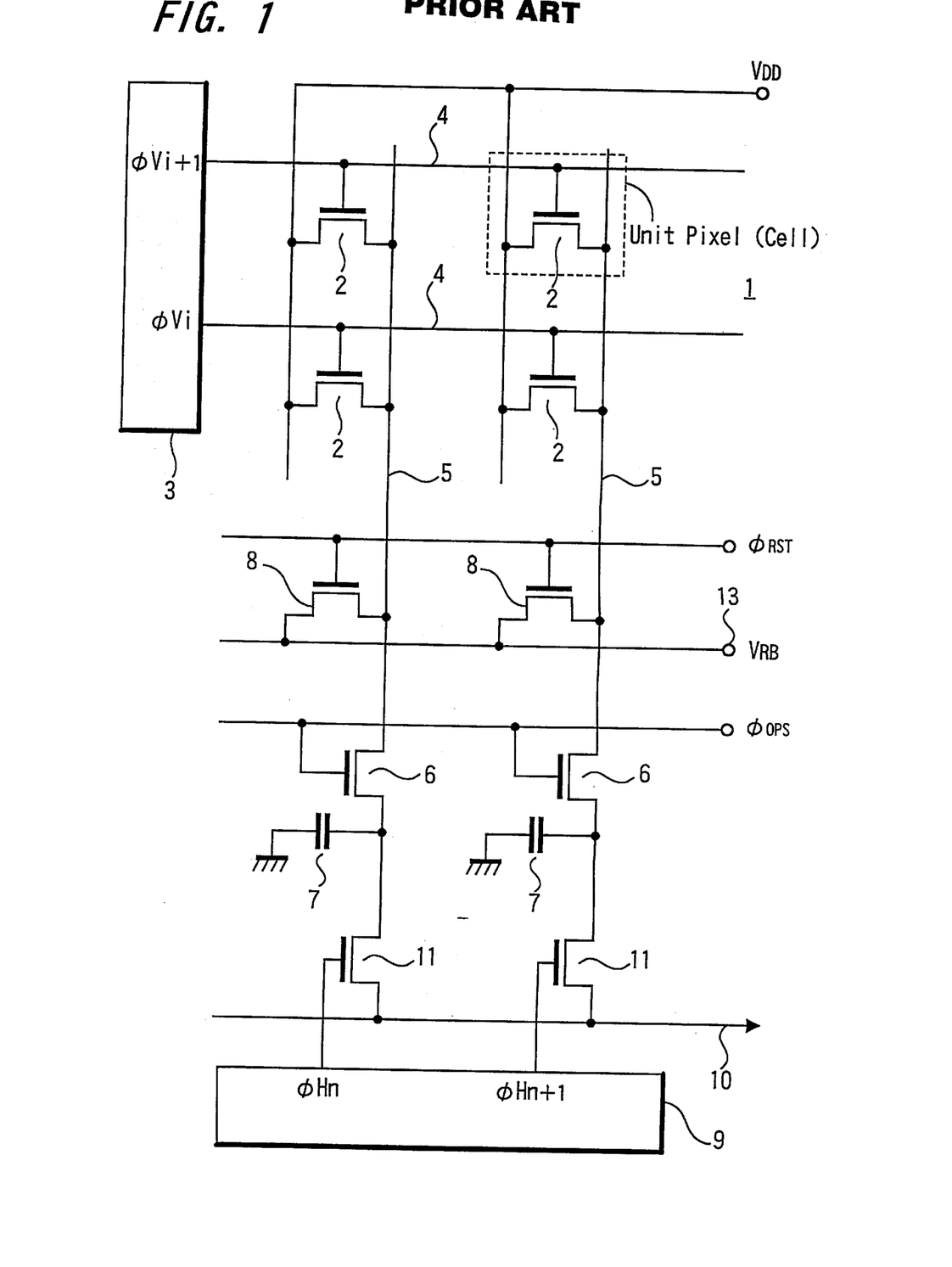
FIG. 1 is a diagram showing an arrangement of an amplification type solid state imaging device of a capacity load operation system.

FIG. 1 is a diagram showing an arrangement of an amplification type solid state imaging device of a capacity load operation system.

An amplification type solid state imaging device 1 has light sensors, i.e., pixel MOS transistors 2 forming a plurality of unit pixels (cells) and arranged in a matrix fashion. The gate of each of the pixel MOS transistors 2 is connected to a vertical selection line 4 selected in response to a vertical scanning signal (i.e., a vertical selection pulse) $\phi V$ [$\phi V_1$, ... $\phi V_i$, ... $\phi V_{i+1}$, ...] supplied from a vertical scanning circuit 3 forming a shift register or the like. The drain of each of the pixel MOS transistors 2 is connected to a power source $V_{DD}$. Sources of the pixel MOS transistors 2 in one vertical column are connected to a vertical signal line 5.

The vertical signal line 5 is connected through an operation MOS switch 6 to a load capacity element 7 for holding a signal voltage (charge). The load capacity element 7 is connected between the vertical signal line 5 and a ground potential. The gate of the operation MOS switch 6 is applied with an operation pulse $\phi_{OPS}$.

The vertical signal line 5 between the source of the pixel MOS transistor 2 and the operation MOS switch 6 is connected through a reset MOS switch 8 serving as switch for correcting the load capacity element 7 and the vertical signal line 5 to a reset bias voltage terminal 13 for supplying a reset bias voltage $V_{RB}$. The gate of the reset MOS switch 8 is supplied with a reset pulse $\phi_{RST}$.

A horizontal scanning circuit 9 formed of a shift register or the like successively supplies horizontal scanning pulses $\phi H$ [$\phi H_1$, ... $\phi H_n$, $\phi H_{n=1}$, ...] to the gates of a horizontal MOS switches 11 connected to a horizontal signal line 10. An output end of the horizontal signal line 10 is connected to an outputting circuit (e.g., a charge detecting circuit).

Figure 2:
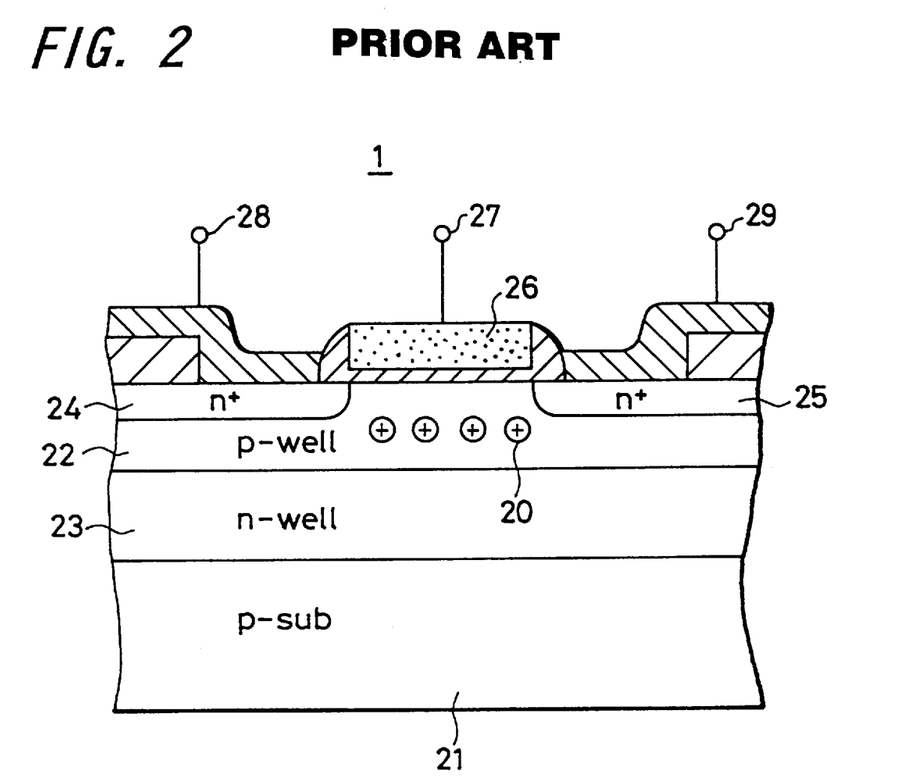
FIG. 2 is a cross-sectional view showing an arrangement of a pixel MOS transistor formed of a semiconductor.

FIG. 2 is a cross-sectional view showing an arrangement of a semiconductor of a unit pixel (i.e., the pixel MOS transistor) 2 of the amplification type solid state imaging device 1.

As shown in FIG. 2, the solid state imaging device 1 has a first conductive type, e.g., p-type semiconductor substrate 21, a p-type well region 22 for accumulating a signal charge obtained by photoelectric conversion, i.e., a hole 20 in this example, and a second conductive type, i.e., an n-type well region 23. An n-type source region 24 and an n-type drain region 25 are formed in the p-type well region 22. A gate electrode 26 formed of a light-transmissive thin film polycrystal silicone, for example, is formed on the p-type well region 22 between the n-type source and drain regions 24, 25. The holes 20 accumulated by photoelectric conversion in the p-type well region 22 immediately under the gate electrode 26 control a channel current (drain current) generated upon a reading operation. A change amount of the channel current is used for a signal output.

Figure 3:
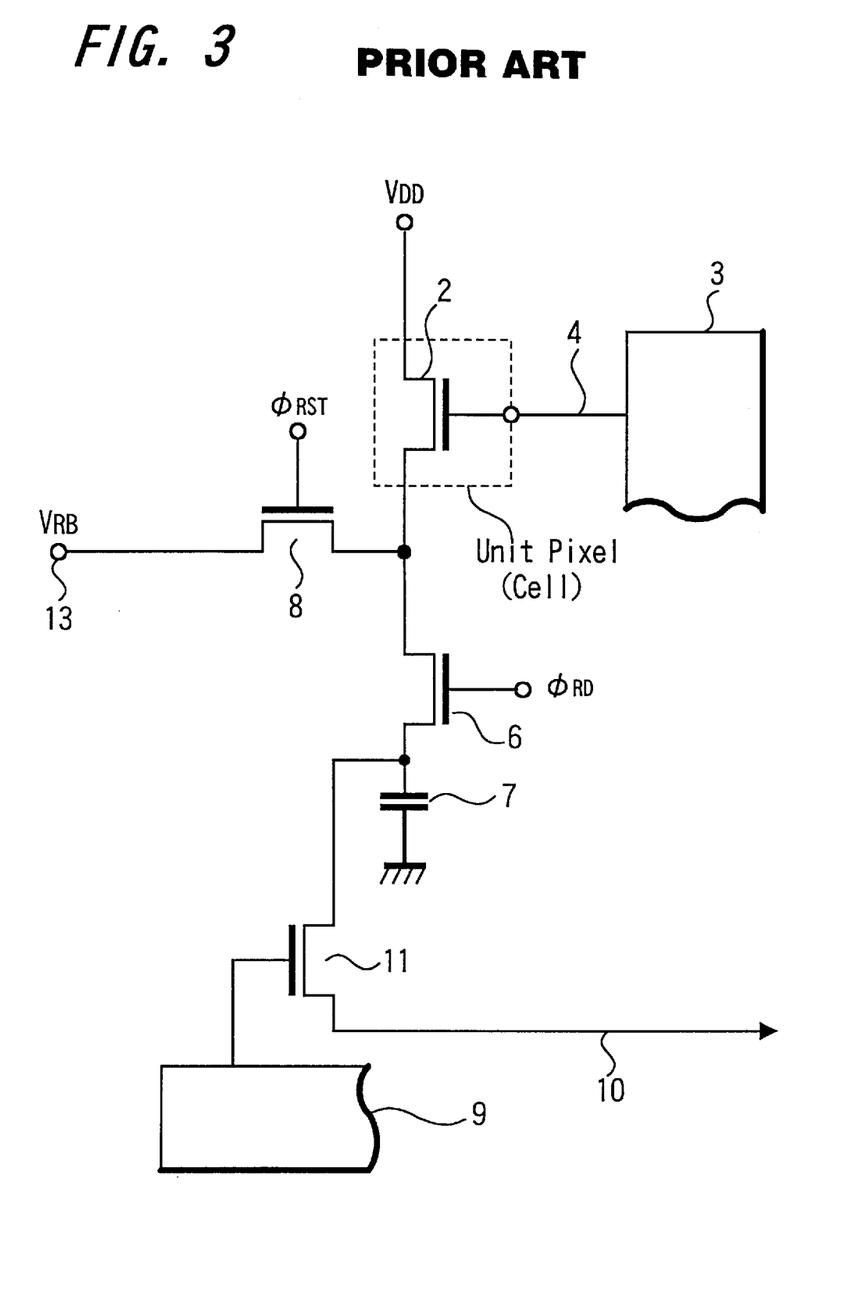
FIG. 3 is a diagram showing a circuit arrangement corresponding to one pixel shown in FIG. 1.

FIG. 3 is a diagram showing a circuit arrangement corresponding to one pixel shown in FIG. 1.

In the amplification type solid state imaging device 1, in a horizontal blanking period, voltages across the vertical signal line 5 and the load capacity element 7 are reset to the reset bias voltage $V_{RB}$ before an operation period of the pixel MOS transistors 2. Specifically, the reset MOS switch 8 and the operation MOS switch 6 are simultaneously set in their on-states by respectively receiving the reset pulse $\phi_{RST}$ and the operation pulse $\phi_{OPS}$. As a result, initial voltages of the vertical signal line 5 and the load capacity element 7 before the operation period of the pixel MOS transistors 2 are reset to the reset bias voltage $V_{RB}$.

After this reset operation, the reset MOS switch 8 is set in its off-state and a vertical selection pulse $V_i$ is applied to the vertical selection line 4, e.g., the vertical selection line 4 of ith row. At this time, the operation MOS switch 6 is still receiving with the operation pulse $\phi_{OPS}$, thereby being kept in its on-state.

A signal voltage of one row amount of the pixel MOS transistor 2 of the ith row selected at this time is held in the corresponding load capacity element 7. Specifically, the signal voltage equivalent to a channel potential corresponding to a signal charge amount (hole amount) accumulated in the pixel MOS transistor 2 is held in the load capacity element 7. In the pixel reset period at the end of the horizontal blanking period, a substrate pulse $\phi V_{SUB}$ (not shown) is applied to the substrate, for example, thereby the signal charge accumulated in the pixel MOS transistor 2 is drained to the substrate.

The signal voltages held in the load capacity elements 7 are released to the horizontal signal line 10 as signal charges by successively setting the horizontal MOS switches 11 to their on-states in response to the horizontal scanning signals $\phi H$ [$\phi H_1$, ... $\phi H_n$, ... $\phi H_{n=1}$, ...].

It is desirable to reduce a dark current in the above-mentioned amplification type solid state imaging device 1 as much as possible. The dark current is produced when a hot carrier is generated in the pixel MOS transistor and when a pair of electron holes is generated at the surface of the gate portion of the pixel MOS transistor.

When the pixel MOS transistor 2 is in its off-state in the amplification type solid state imaging device 1, current does not flow in the pixel MOS transistor, thereby generation of the hot carrier is prevented. Therefore, the dark current resulting from the generation of the hot carrier is not produced. However, since the pixel MOS transistor 2 is set in its off-state in a charge accumulation period (a so-called light receiving period), charges (electrons) are prevented from being injected to the surface of the gate porion of the pixel MOS transistor 2 when it is in its off-state. Therefore, a pair of electron holes is produced which increases the dark current.

SUMMARY OF THE INVENTION

In view of such aspects, it is an object of the present invention to provide a solid state imaging device which can reduce a dark current in a pixel.

It is another object of the present invention to provide a solid state imaging device which can reduce fixed pattern noise.

According to a first aspect of the present invention, a solid state imaging device according to the present invention includes a pixel transistor having a first electrode, a second electrode and a control electrode, the pixel transistor accumulating a charge corresponding to an amount of received light, a power supply terminal connected to the first electrode, a signal line connected to the second electrode, a reset bias terminal connected to the first electrode and the second electrode, a first switch connected between the power source terminal and the first electrode, a second switch connected between the reset bias terminal and the first electrode, and a reset switch connected between the reset bias terminal and the second electrode.

According to a second aspect of the present invention, the first switch is set in its off-state and the second switch and the reset switch are set in their on-states during a first period of a horizontal blanking period. Thereafter, a state of each of the first, second and reset switches is changed. The first switch is set in its on-state and the second switch and the reset switch are in their off-states in a second period of the horizontal blanking period succeeding to the first period.

DESCRIPTION OF THE PREFERRED EMBODIMENTS

A solid state imaging device according to the present invention includes a plurality of pixel MOS transistors for accumulating charges generated by photoelectric conversion in a portion in the vicinity of a channel, a power source connected to a drain of the pixel MOS transistor, a load capacity element connected to a source side of the pixel MOS transistor through an operation switch, a reset bias voltage supply terminal connected through a reset switch to the source side of the pixel MOS transistor for resetting the load capacity element, a first switch means connected between a drain of the pixel MOS transistor and the power source, and a second switch connected between the drain of the pixel MOS transistor and the reset bias voltage supply terminal. In a period other than a reading operation period, voltages at the source and drain of the pixel MOS transistor are set to the same potential, i.e., a reset bias voltage through the reset switch and the second switch means.

According to the solid state imaging device of the present invention, after the reset switch is set in its off-state, the first switch means connected between the drain of the pixel MOS transistor and the power source is set in its on-state, thereby the reading operation is carried out.

A solid state imaging device according to an embodiment of the present invention will hereinafter be described with reference to the accompanying drawings.

Figure 4:
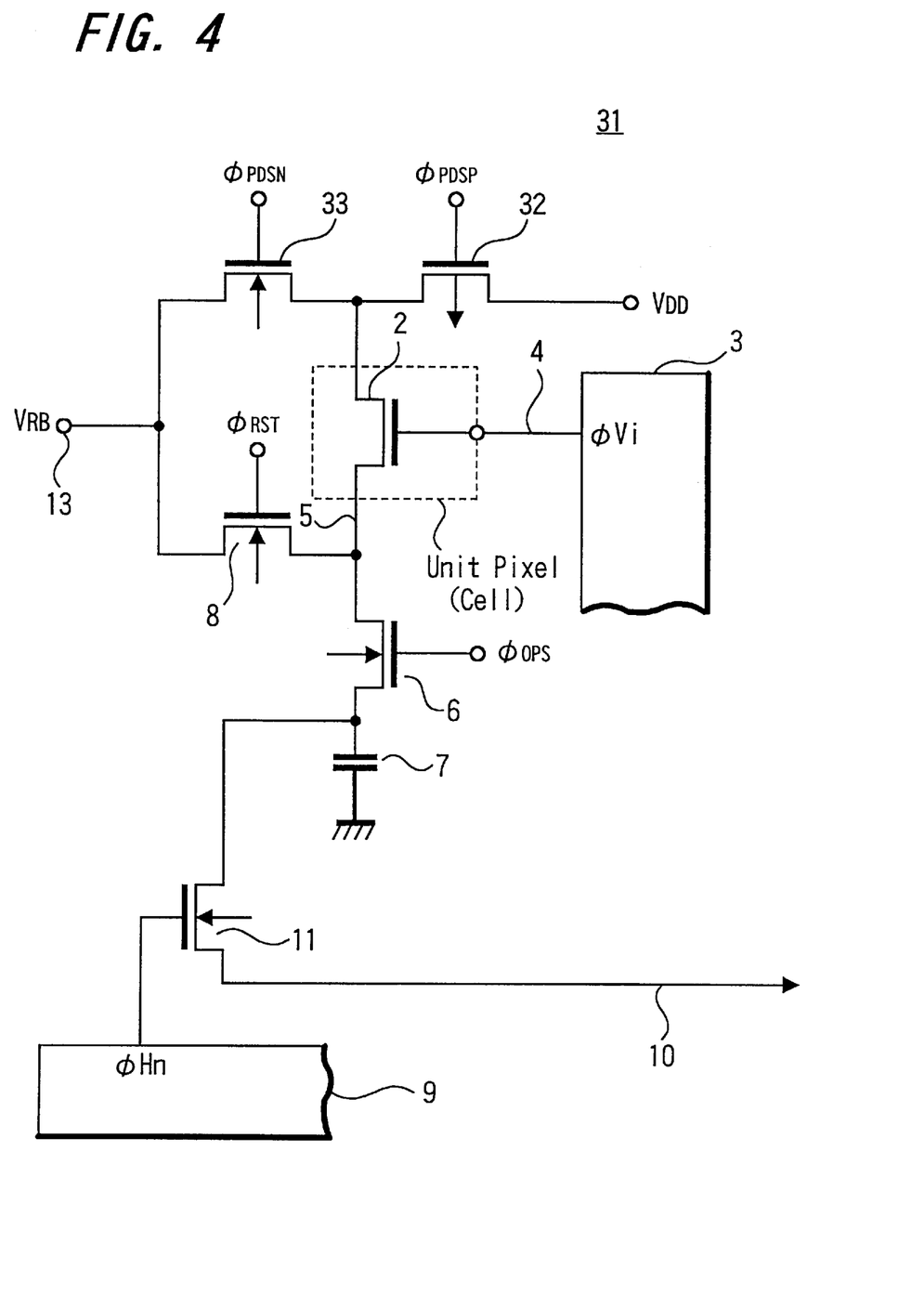
FIG. 4 is a diagram showing a circuit arrangement corresponding to one pixel of a solid state imaging device according to a first embodiment of the present invention.

FIG. 4 is a diagram showing a basic circuit arrangement of an amplification type solid state imaging device 31 of a capacity load operation system according to the present invention (FIG. 4 shows a circuit arrangement corresponding to one pixel similar to that shown in FIG. 3).

Similar to the arrangement of the amplification type solid state imaging device shown in FIG. 1, the amplification type solid state imaging device 31 according to this embodiment has a plurality of light sensors forming unit pixels, i.e., pixel MOS transistors 2 arranged in a matrix fashion. The gate of each of the pixel MOS transistors 2 is connected to a vertical selection line 4 selected by a vertical scanning signal (i.e., a vertical selection pulse) $\phi V [\phi V_1, \ldots \phi V_i, \phi V_{i+1}, \ldots]$ from a vertical scanning circuit formed of a shift register or the like. The drain of each of the pixel MOS transistors 2 is connected to a side of the power source $V_{DD}$ and a source thereof at each column is connected to a vertical signal line 5.

The vertical signal line 5 is connected through an operation MOS switch 6 formed of, for example, an n-channel type MOS transistor with a load capacity element 7 for holding a signal voltage (charge). The load capacity element 7 is connected between the vertical signal line 5 and ground. The gate of the operation MOS switch 6 receives an operation pulse $\phi_{OPS}$.

The vertical signal line 5 between the source of the pixel MOS transistor 2 and the operation MOS switch 6 is connected to a reset bias voltage supply terminal 13 for supplying a reset bias voltage $V_{RB}$ through a reset MOS switch 8 formed of, for example, an n-channel type MOS transistor also serving to reset the vertical signal line 5, i.e., charge a source side parasitic capacitor of the n-channel type MOS transistor 2. The gate of the reset MOS switch 8 is supplied with a reset pulse $\phi_{RST}$.

The solid state imaging device 31 has a horizontal scanning circuit 9 formed of a shift register or the like. The horizontal scanning circuit 9 successively supplies horizontal scanning signals (i.e., horizontal scanning pulses) $\phi H$ $[\phi H_1, \ldots \phi H_n, \ldots \phi H_{n+1} \ldots]$ to the gates of horizontal MOS switches 11 each formed of an n-channel MOS transistors, for example, and connected to a horizontal signal line 10. An output circuit (e.g., a charge detecting circuit), though not shown, is connected with an output end of the horizontal signal line 10.

In this embodiment, a first MOS switch 32 formed of a p-channel type MOS transistor, for example, is connected between the drain of the pixel MOS transistor 2 and the power source $V_{DD}$, and a second MOS switch 33 formed of an n-channel type MOS transistor, for example, for charging the parasitic capacitor on the drain side of the pixel MOS transistor 2 is connected between the drain of the pixel MOS transistor 2 and the reset bias voltage supply terminal 13. A gate of the first MOS switch 32 is supplied with a drive pulse $\phi_{PDSP}$, and a gate of the second MOS switch 33 is supplied with a drive pulse $\phi_{PDSN}$, where a relationship between the power supply $V_{DD}$ and the reset bias voltage $V_{RB}$ is $V_{DD} > V_{RB}$.

An operation of the amplification type solid state imaging device 31 will be described.

Figure 5:
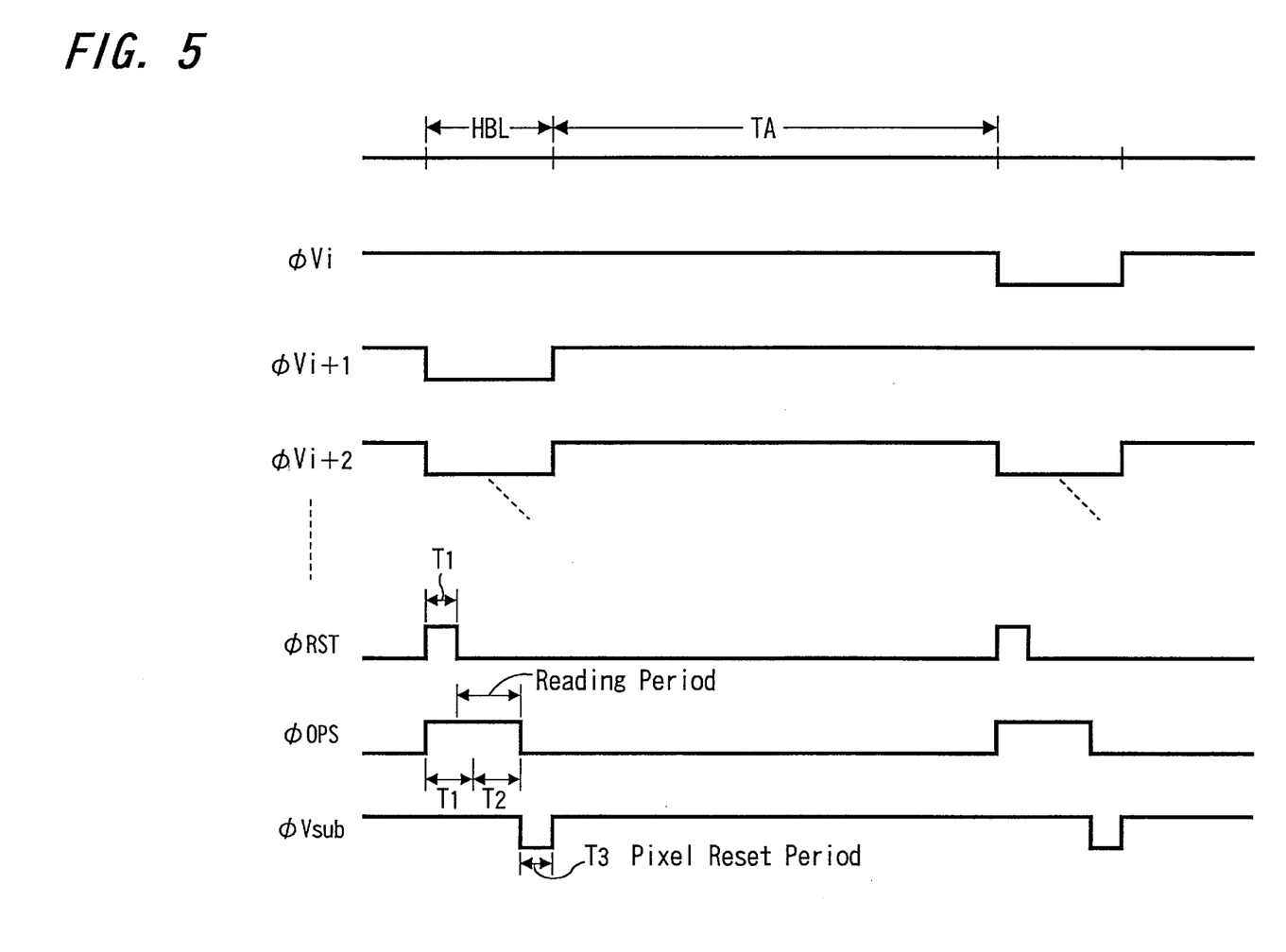
FIG. 5 is a timing chart used to explain a drive timing of the solid state imaging device according to the present invention.

Initially, the operation will be described schematically. As shown in FIG. 5 which is a drive timing chart, during a period except a horizontal blanking period when the pixel MOS transistor 2 is not selected, i.e., during a horizontal blanking period HBL and a horizontal effective scanning period (i.e., a so-called standby period) when it is selected, the gate of the pixel MOS transistor 2 is supplied with the vertical selection pulse φV and kept in its on-state.

During the horizontal blanking period HBL, a signal voltage at the pixel MOS transistor 2, i.e., a signal voltage equivalent to a channel potential corresponding to a signal charge amount (hole amount) accumulated in the pixel MOS transistor 2 is read and supplied to the load capacity element 7. Specifically, in a reset period $T_1$ preceding a reading period $T_2$ of the pixel MOS transistor 2 during the horizontal blanking period HBL, the reset MOS switch 8 is supplied with the reset pulse $\phi_{RST}$ and hence set in its on-state and simultaneously the operation MOS switch 6 is supplied with the operation pulse $\phi_{OPS}$ and hence set in its on-state, thereby the load capacity element 7 is reset by the reset bias voltage $V_{RB}$.

During the reading period $T_2$ when the reset MOS switch 8 is set in its off-state and the operation MOS switch 6 is still kept in its on-state, the signal voltage of the pixel MOS transistor 2 is held by the load capacity element 7. After the reading operation is finished, the substrate is applied with a substrate pulse $\phi V_{SUB}$, whereby the charges (holes) accumulated in the pixel MOS transistor 2 are drained through the substrate.

Thereafter, during a horizontal effective scanning period $T_A$, the signal charges are successively transferred to the horizontal signal line 10 and then output by one line at a time in response to each of the horizontal scanning pulses φH [$\phi H_1, \ldots \phi H_n, \phi H_{n+1}, \ldots$] from the horizontal scanning circuit 9.

The amplification type solid state imaging device 31 is schematically operated as described above.

Since the amplification type solid state imaging device 31 has the circuit arrangement as shown in FIG. 4, current is prevented from flowing through the pixel MOS transistor 2 except during the reading operation. A drive timing therefor will be described.

Figure 6:
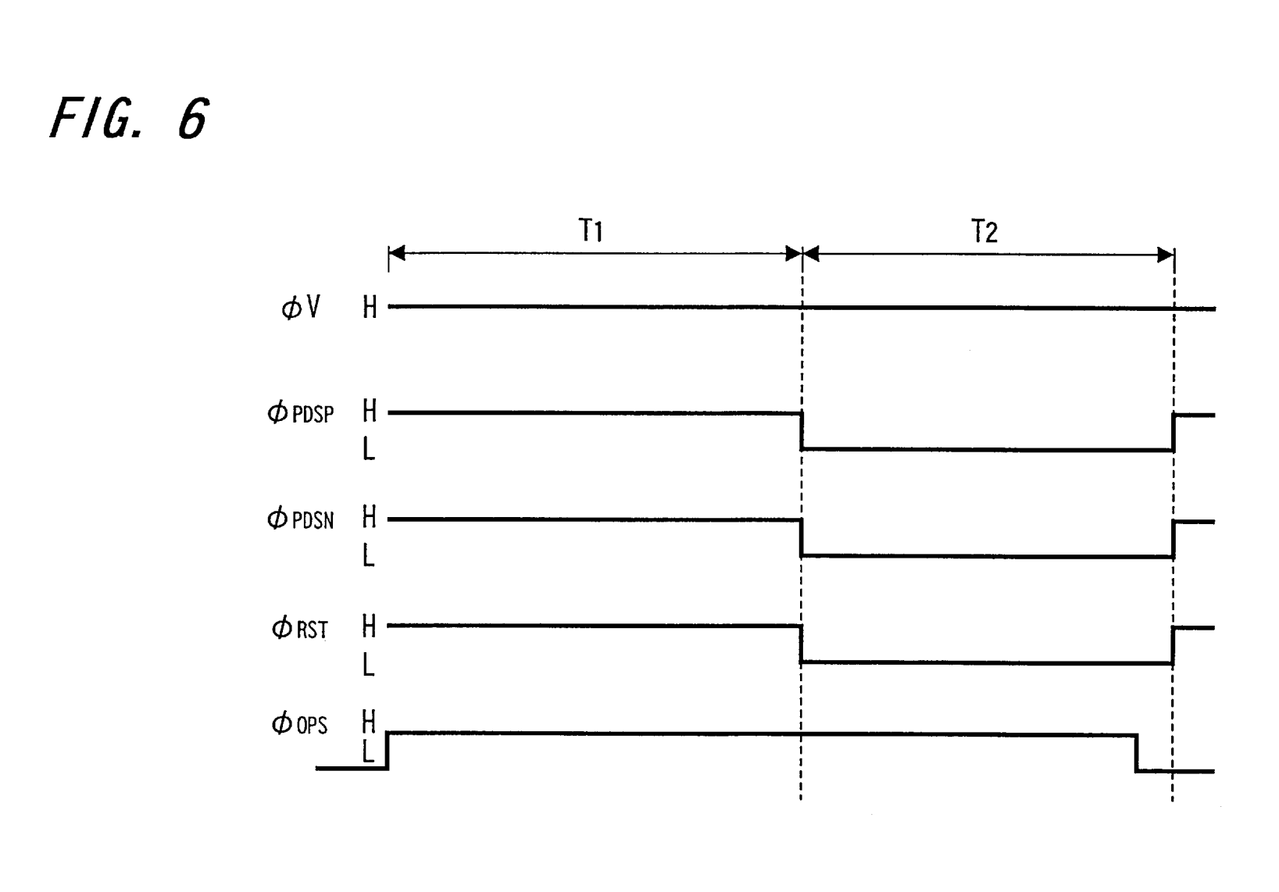
FIG. 6 is a timing chart used to explain a drive timing of the solid state imaging device according to the first embodiment of the present invention.

FIG. 6 shows an example of the drive timing. As shown in FIG. 6, during the reset period $T_1$, the drive pulses $\phi_{PDSP}$ and $\phi_{PDSN}$ are set at their high levels, whereby the first MOS switch 32 and the second MOS switch 33 are respectively set in the off-state and the on-state. The reset pulse $\phi_{RST}$ is set at its high level, whereby the reset MOS transistor 8 is set in its on-state. The operation pulse $\phi_{OPS}$ is set at its high level, whereby the operation MOS switch 6 is set in its on-state.

Thus, the voltage at the load capacity element 7 is reset to the reset bias voltage $V_{RB}$. Simultaneously, the parasitic capacitor of the vertical signal line 5 on the source side of the pixel MOS transistor 2 and a parasitic capacitor of a drain side wiring are charged. As a result, potentials at the source and drain of the pixel MOS transistor 2 are reset to the same potential, i.e., the reset voltage $V_{RB}$.

During the reading period $T_2$, gates of the first and second MOS switches 32, 33 are respectively supplied with the drive pulses $\phi_{PDSP}$ and $\phi_{PDSN}$ at their low levels and hence the first and second MOS switches 32, 33 are respectively set in the on-state and the off-state. At this time, since a gate of the reset MOS switch 8 is supplied with the reset pulse $\phi_{RST}$ of low level, the reset MOS switch 8 is set in its of-state. As a result, the signal voltage of the pixel MOS transistor 2 is held by the load capacity element 7.

After the operation MOS switch 6 is set in its off-state, the signal charges held by the load capacity element 7 flow toward the horizontal signal line 10 and then are output through the outputting circuit as the signal voltage.

During a period other than the reading period $T_2$, the first MOS switch 32, the second MOS switch 33 and the reset MOS switch 8 are respectively kept in their off-state, on-state and on-state.

In this embodiment, the gates of the first MOS switch 32, the second MOS switch 33 and the reset MOS switch 8 are connected to the common terminal. The common drive pulse applied to this common terminal can be respectively applied to the first MOS switch 32, the second MOS switch 33 and the reset MOS switch 8 as the drive pulses $\phi_{PDSP}$ and $\phi_{PDSN}$ and the reset pulse $\phi_{RST}$.

According to this embodiment, since the reset bias voltage $V_{RB}$ resets the source and drain of the pixel MOS transistor 2 at the same potential upon the reset operation, the current between the source and drain thereof does not flow although the pixel MOS transistor 2 is in its on-state. Therefore, since the hot carrier is not generated, the dark current resulting from the generation of the hot carried can be prevented. Moreover, since the pixel MOS transistor 2 is in its on-state, electrons on the surface of the gate portion are increased, thereby suppressing generation of a paired electron and hole on the surface. As a result, it is possible to further suppress generation of the dark current.

Moreover, since the second MOS switch 33 is provided between the reset bias voltage supply terminal 13 and the drain of the pixel MOS transistor 2, it is possible to reset rapidly the potential at the drain side of the pixel MOS transistor 2 to the reset bias voltage $V_{RB}$.

If the amplification type solid state imaging sensor 31 does not have the second MOS transistor 33, then, when the potentials at the source and drain of the pixel MOS transistor 2 are reset by using the reset MOS switch 8, the time constant by a resistance R of the pixel MOS transistor 2 and a drain side parasitic capacitance C disable the potentials at the drain thereof to be reset during the reset period $T_1$. However, according to the first embodiment, the second MOS switch 33 enables the potential at the drain side of the pixel MOS transistor 2 to be reset rapidly. If the second MOS switch 33 is not provided, then the current for charging the drain line flows into the pixel MOS transistor 2, which leads to the generation of the dark current.

When the capacity loaded operation system is employed, it is necessary to set the sufficient reading period $T_2$. Since the above-mentioned operation must be carried out in a limited time of the horizontal blanking period HBL, it is possible to carry out the drive operation at the timings shown in FIG. 6.

Figure 7:
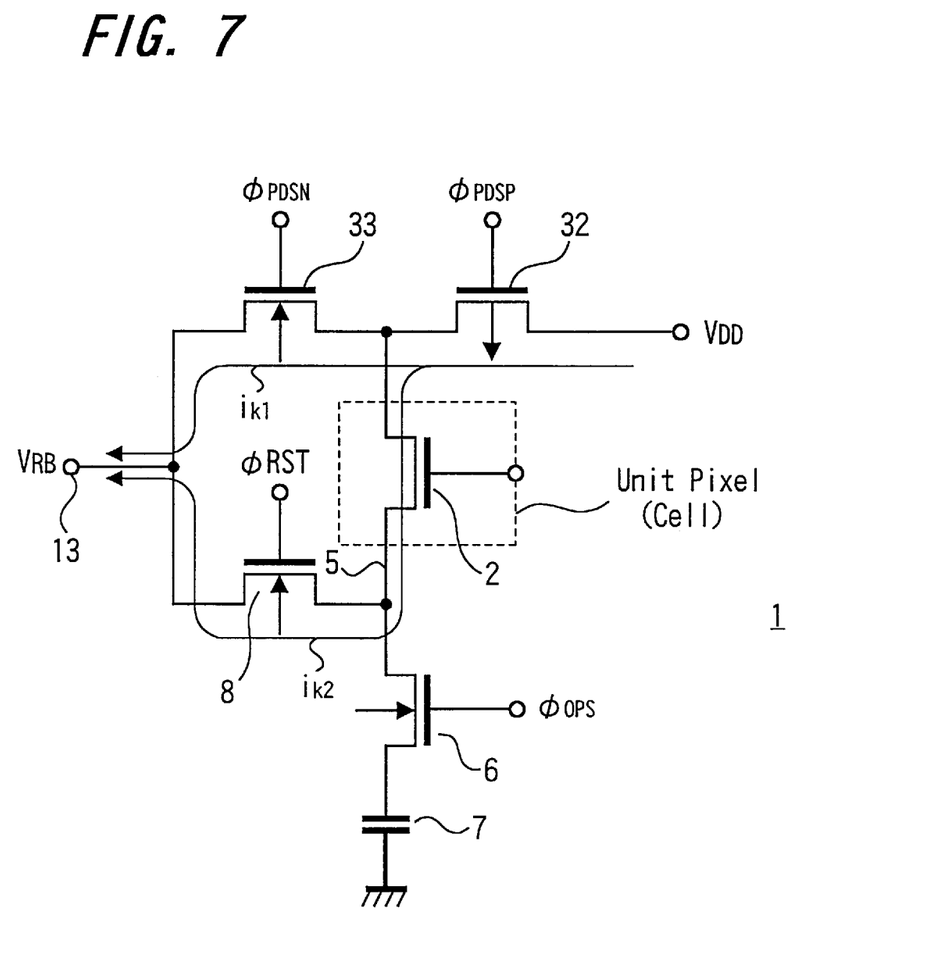
FIG. 7 is a diagram used to explain a through current generated in the solid state imaging device according to the first embodiment.

However, if the drive operation is carried out at the timings shown in FIG. 6, then, when the operation is changed from the reset operation to the reading operation, i.e., when the first MOS switch 32 is changed from its off-state to its on-state, the first and second MOS switches 32, 33 operates similar to an invertor, thereby currents $i_{k1}$, and $i_{k2}$ flow as shown by solid arrows in FIG. 7. Specifically, the through current $i_{k1}$ flows from the power source $V_{DD}$ through the first and second MOS switches 32, 33 toward the reset bias voltage supply terminal 13, and the through current $i_{k2}$ flows from the power source $V_{DD}$ through the first MOS switch 32, the pixel MOS transistor 2 and the reset MOS switch 8 toward the reset bias voltage supply terminal 13.

When the through current $i_{k2}$ of the above two through currents $i_{k1}, i_{k2}$ flows through the pixel MOS transistor 2, the hot carriers are generated and mixed into carriers generated by light. As a result, the hot carriers may disadvantageously occur on a picture screen as fixed pattern noise.

Solid state imaging devices according to second and third embodiments are directed to improve the above points and will be described with reference to FIGS. 8 and 9, respectively.

Figure 8:
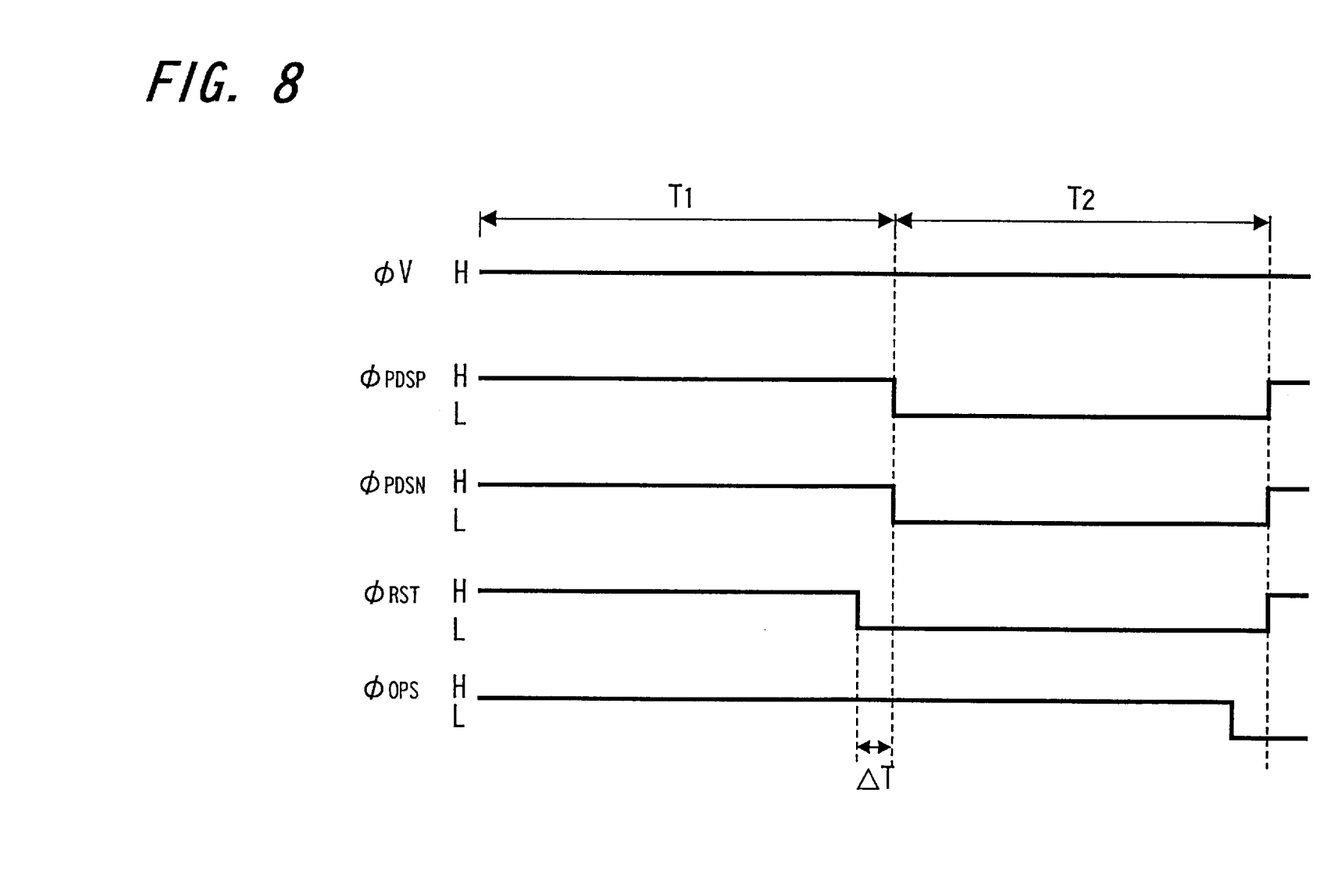
FIG. 8 is a timing chart used to explain a drive timing of the solid state imaging device according to a second embodiment of the present invention.

FIG. 8 is a timing chart used to explain a drive timing of the solid state imaging device according to the second embodiment. As shown in FIG. 8, after the reset MOS switch 8 is set in its off-state, the first MOS switch 32 is set in its on-state and at the same time the second MOS switch 33 is set in its off-state. As a result, even if the through current $i_{k1}$ flows through the first and second MOS switches 32, 33, the through current $i_{k2}$ is prevented from flowing through the pixel MOS transistor 2.

Specifically, as shown in FIG. 8, at a time immediately before the reset operation is finished, the reset pulse $\phi_{RST}$ is set at the low level to thereby set the reset MOS switch 8 in its off-state. After a time ΔT, the respective drive pulses $\phi_{PDSP}$ and $\phi_{PDSN}$ for the first and second MOS switches 32, 33 are set at the low levels to set the first MOS switch 32 in its on-state and the second MOS switch in its off-state. Thereafter, the reading operation is began.

In order to realize this operation, it is sufficient to apply the same drive pulse to the gates of the first and second MOS switches 32, 33 commonly connected to each other, which allows the first and second MOS switches 32, 33 to be simultaneously supplied with the drive pulses $\phi_{PDSP}$ and $\phi_{PDSN}$, respectively.

According to the drive timing of the second embodiment shown in FIG. 8, since the reset MOS switch 8 is set in its off-state before the first MOS switch 32 is changed from its off-state to its on-state, the through current $i_{k2}$ is prevented from flowing through the pixel MOS transistor 2 or is reduced, which can reduce the fixed pattern noise resulting from the hot carriers.

Figure 9:
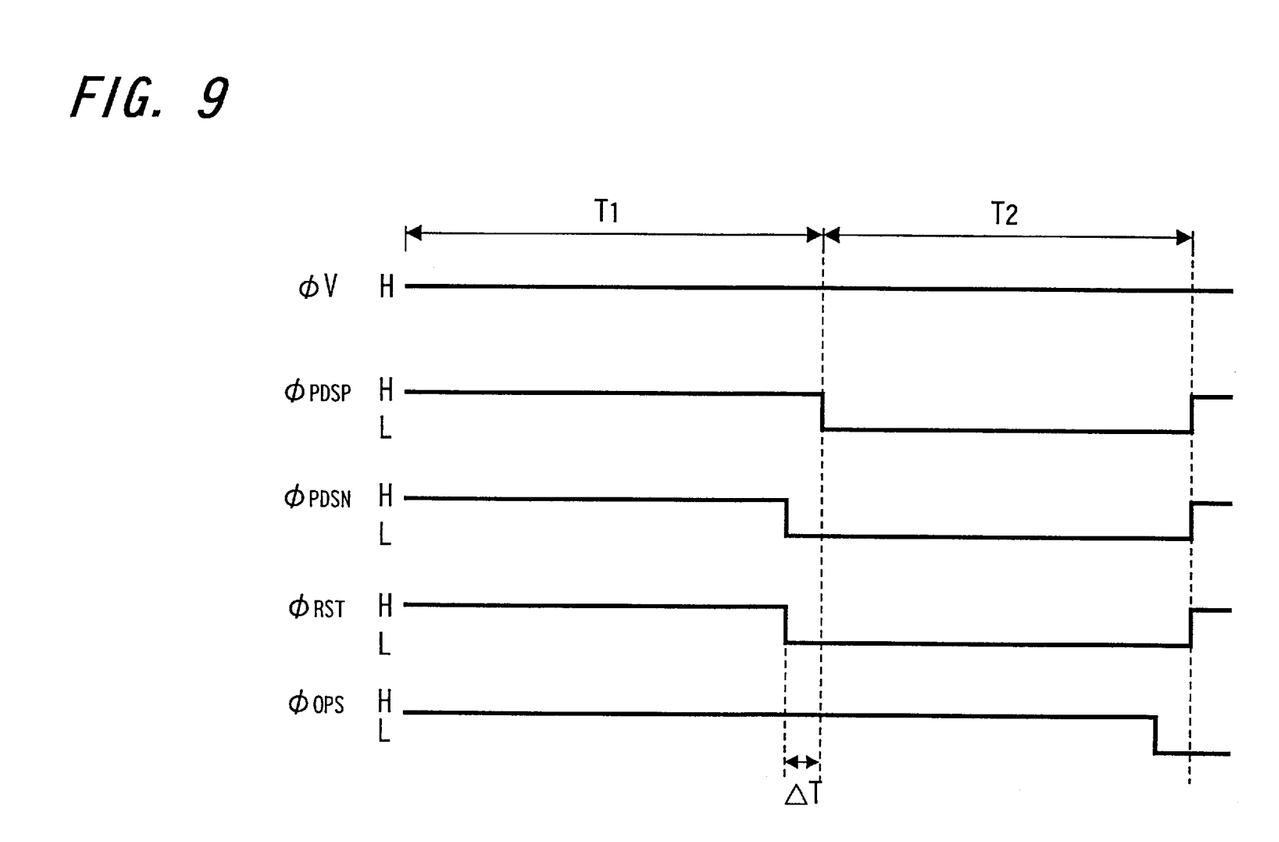
FIG. 9 is a timing chart used to explain a drive timing of the solid state imaging device according to a third embodiment of the present invention.

FIG. 9 is a timing chart used to explain a drive timing of the solid state imaging device according to the third embodiment. As shown in FIG. 9, after the reset MOS switch 8 and the second MOS switch 33 are set in their off-states, the first MOS switch 32 is set in its on-state, thereby the through currents $i_{k1}$, and $i_{k2}$ are prevented from flowing.

Specifically, as shown in FIG. 9, at a time immediately before the reset operation is finished, the reset pulse $\phi_{RST}$ and the drive pulse $\phi_{PDSN}$ are set at low levels to set the reset MOS switch 8 and the second MOS switch 33 in their off-states, respectively. After a time of ΔT, the drive pulse $\phi_{PDSP}$ is set at the low level to set the first MOS switch 32 in its on-state. Then, the reading operation is started.

In order to realize the above operation, it is sufficient to apply the same drive pulse to the gates of the second MOS switch 33 and the reset MOS switch 8 commonly connected to each other. This allows the second MOS switch 33 and the reset MOS switch 8 to be simultaneously supplied with the drive pulse $\phi_{PDSN}$ and the reset pulse $\phi_{RST}$, respectively. The gate of the first MOS switch 32 is supplied with the drive pulse $\phi_{PDSP}$ from an independent terminal.

According to the drive timing of the third embodiment shown in FIG. 9, since the first MOS switch 32 is set in its on-state after the second MOS switch 33 and the reset MOS switch 8 are changed from their off-states to their on-states, the through currents $i_{k1}$, $i_{k2}$ are prevented from flowing and hence the through current $i_{k2}$ flowing through the pixel MOS transistor 2 is blocked or reduced when the reset operation is switched to the reading operation. This can reduce the fixed pattern noise resulting from the hot carriers.

According to the solid state imaging device of the present invention, it is possible to control the dark current in the charge accumulation period (light receiving period) of the pixel MOS transistor 2.

When the reset operation is switched to the reading operation, it is possible to prevent the current from flowing into the pixel MOS transistor 2 or to reduce the above current drastically. Therefore, it is possible to reduce the fixed pattern noise resulting from the hot carriers and hence the dark current.

Therefore, it is possible to provide a solid state imaging device with a high quality.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A solid state imaging device comprising:
    a pixel transistor having a first electrode, a second electrode and a control electrode, said pixel transistor accumulating a charge corresponding to an amount of received light;
    a power supply terminal connected to said first electrode;
    a signal line connected to said second electrode;
    a reset bias terminal connected to said first electrode and said second electrode;
    a first switch connected between said power source terminal and said first electrode;
    a second switch connected between said reset bias terminal and said first electrode; and
    a reset switch connected between said reset bias terminal and said second electrode.

2. A solid state imaging device according to claim 1, further comprising: a capacitor connected to said signal line through an operation switch.

3. A solid state imaging device according to claim 2, further comprising a horizontal switch connected between a horizontal signal line and a point between said capacitor and said operation switch.

4. A solid state imaging device according to claim 3, wherein said horizontal switch is a transistor having a gate electrode, said device further comprising a horizontal scanning circuit which supplies a horizontal scanning signal to said gate of said horizontal switch.

5. A solid state imaging device according to claim 1, further comprising wherein said control electrode is connected to a vertical scanning line over which said control electrode receives a vertical scanning signal from a vertical scanning circuit.

6. A solid state imaging device according to claim 1, wherein said pixel transistor is a MOS transistor.

7. A solid state imaging device according to claim 1, wherein said first switch is formed of a MOS FET having a first polarity and said second switch and said reset switch are formed of MOS FETs having polarity reverse to said first polarity.

8. A method of driving a solid state imaging device having a pixel transistor which has a first electrode, a second electrode and a control electrode, said pixel transistor accumulating a charge corresponding to an amount of received light, a power supply terminal connected to said first electrode, a signal line connected to said second electrode, a reset bias terminal connected to said first electrode and said second electrode, a first switch connected between said power source terminal and said first electrode, a second switch connected between said reset bias terminal and said first electrode, and a reset switch connected between said reset bias terminal and said second electrode, comprising the steps of:

setting said first switch in its off-state and, setting said second switch and said reset switch in their on-states during a first period of a horizontal blanking period;

thereafter changing a state of each of said first, second and reset switches; and     setting said first switch in its on-state and setting said second switch and said reset switch in their off-states in a second period of said horizontal blanking period succeeding to said first period.

9. A method of driving a solid state imaging device according to claim 8, wherein said reset switch is changed from its on-state to its off-state before said first switch is changed from its off-state to its on-state.

10. A method of driving a solid state imaging device according to claim 9, wherein said second switch is changed from its on-state to its off-state before said first switch is changed from its off-state to its on-state.

11. A method of driving a solid state imaging device according to claim 8, further comprising:

supplying a power supply voltage to said first electrode and setting said pixel transistor in an on-state during it signal reading operation period; and     supplying said first and second electrodes with a same predetermined voltage during a light receiving period.

12. A method of driving a solid state imaging device having a pixel transistor which has a first electrode, a second electrode and a control electrode, said pixel transistor accumulating a charge corresponding to an amount of received light, a power supply terminal connected to said first electrode, a signal line connected to said second electrode, a reset bias terminal connected to said first electrode and said second electrode, a first switch connected between said power source terminal and said first electrode, a second switch connected between said reset bias terminal and said first electrode, and a reset switch connected between said reset bias terminal and said second electrode, said method comprising the steps of:

keeping said first switch in its off-state and keeping said second switch and said reset switch in their on-states during a light accumulation period;

thereafter changing states of said first switch, said second switch and said reset switch; and     keeping said first switch in its on-state and keeping said second switch and said reset switch in their off-states during a reading period.

13. A method of driving a solid state imaging device according to claim 12, further comprising changing said reset switch from an on-state to an off-state before changing said first switch from an off-state to an on-state.

14. A method of driving a solid state imaging device according to claim 13, further comprising changing said second switch from an on-state to an off-state before changing said first switch from an off-state to an on-state.

15. A method of driving a solid state imaging device having a pixel transistor which has a first electrode, a second electrode and a control electrode, said pixel transistor accumulating a charge corresponding to an amount of received light, a power supply terminal connected to said first electrode, a signal line connected to said second electrode, a reset bias terminal connected to said first electrode and said second electrode, a first switch connected between said power source terminal and said first electrode, a second switch connected between said reset bias terminal and said first electrode, a reset switch connected between said reset bias terminal and said second electrode, and a capacitor connected to said signal line through an operation switch, said method comprising the steps of:

keeping said first switch and said operation switch in an off-state while keeping said second switch and said reset switch in an on-state during an effective scanning period;

thereafter changing states of said first switch, said second switch, said reset switch and said operation switch; and     keeping said first switch and said operation switch in an on-state and keeping said second switch and said reset switch in an off-state during a reading period of a horizontal blanking period.

16. A method of driving a solid state imaging device according to claim 15, further comprising changing said reset switch from an on-state to an off-state before changing said first switch from an off-state to an on-state.

17. A method of driving a solid state imaging device according to claim 16, further comprising changing said second switch from an on-state to an off-state before changing said first switch from an off-state to an on-state.

18. A method of driving a solid state imaging device having a pixel transistor which has a first electrode connected to a power supply terminal through a first switch and to a reset voltage bias supply terminal through a second switch, a second terminal connected to a signal line and to said reset voltage bias supply terminal through a reset switch, and a control terminal provided between said first and second electrodes connected to a vertical selection line, said method comprising:

supplying a power supply voltage to said first electrode and setting said pixel transistor in an on-state during a signal reading operation period; and     supplying a common reset voltage to said first and second electrodes during a reset period to reset said pixel transistor without generating dark current.

\* \* \* \* \*